(12) United States Patent
Tilton

(10) Patent No.: US 12,264,020 B2
(45) Date of Patent: Apr. 1, 2025

(54) SYSTEM FOR PNEUMATIC TRANSPORT OF PARTICLES OF A HAZARDOUS SUBSTANCE

(71) Applicant: X-ENERGY, LLC, Rockville, MD (US)

(72) Inventor: Alex Tilton, Knoxville, TN (US)

(73) Assignee: X-Energy, LLC, Rockville, MD (US)

( * ) Notice: Subject to any disclaimer, the term of this patent is extended or adjusted under 35 U.S.C. 154(b) by 60 days.

(21) Appl. No.: 18/310,917

(22) Filed: May 2, 2023

(65) Prior Publication Data
US 2024/0367921 A1      Nov. 7, 2024

(51) Int. Cl.
B65G 53/46      (2006.01)
B65G 53/12      (2006.01)
B65G 53/66      (2006.01)

(52) U.S. Cl.
CPC ............. B65G 53/12 (2013.01); B65G 53/46 (2013.01); B65G 53/66 (2013.01);
(Continued)

(58) Field of Classification Search
None
See application file for complete search history.

(56) References Cited

U.S. PATENT DOCUMENTS 3,233,945 A * 2/1966 Kurtz .......................... B01J 8/18
                                                            406/68
3,689,045 A 9/1972 Coulter
(Continued)

FOREIGN PATENT DOCUMENTS

AU    7977782 A    8/1982
CN    203212012 U    9/2013
(Continued)

OTHER PUBLICATIONS

International Search Report for corresponding PCT Application No. PCT/US2024/020680 mailed on Jul. 19, 2024.

*Primary Examiner* — Joseph A Dillon, Jr.
(74) *Attorney, Agent, or Firm* — Kramer & Amado, P.C.

(57) ABSTRACT

A system for transporting hazardous particles includes a pneumatic conveyer for conveying the hazardous particles to an exit using a carrier gas; and an input mechanism for conveying the hazardous particles to the pneumatic conveyer. The input mechanism includes a tubular chamber for receiving the hazardous particles; an input pipe extending from the tubular chamber for conveying the hazardous particles into the tubular chamber; and an output pipe extending from a bottom of the tubular chamber. The output pipe includes an upper valve movable between a closed position and an open position, a middle valve movable between a closed position and an open position, and a lower valve. The upper valve and the middle valve, when in their respective closed positions, define a storage chamber for storing a portion of the hazardous particles. The upper valve in its open position allows the portion of the hazardous particles to enter the storage chamber, and the middle valve in its open position allows the portion of the hazardous particles in the storage chamber to flow to the lower valve. The lower valve is configured to convey the hazardous particles from the storage chamber to the pneumatic conveyer in a gradual fashion.

15 Claims, 5 Drawing Sheets

(52) U.S. Cl.
CPC .. *B65G 2201/042* (2013.01); *B65G 2203/044* (2013.01); *B65G 2812/1625* (2013.01)

(56) References Cited

U.S. PATENT DOCUMENTS

| | | | | |
|---|---|---|---|---|
| 4,094,551 | A | | 6/1978 | Flain |
| 4,108,500 | A | * | 8/1978 | Stamer ................... B65G 53/12 406/127 |
| 4,118,075 | A | * | 10/1978 | Lubbehusen ...... B65G 53/4691 406/33 |
| 4,369,006 | A | * | 1/1983 | Grams ................... B65G 53/22 406/93 |
| 4,455,111 | A | * | 6/1984 | Jackson ................ B65G 53/08 414/221 |
| 4,790,251 | A | * | 12/1988 | Vidt .......................... F23J 1/00 110/165 R |
| 5,071,289 | A | * | 12/1991 | Spivak ................... B65G 53/22 406/14 |
| 5,285,735 | A | * | 2/1994 | Motoi ..................... F23K 3/02 110/101 CC |
| 5,575,596 | A | * | 11/1996 | Bauer ................... B65G 53/24 406/173 |
| 6,135,317 | A | * | 10/2000 | Ruelle ....................... B01J 8/24 222/254 |
| 6,582,161 | B2 | * | 6/2003 | Noguki ................ B65G 53/526 406/48 |
| 6,682,287 | B2 | * | 1/2004 | Glass .................... B01D 21/302 901/47 |
| 6,994,497 | B1 | * | 2/2006 | Eriksson ................... F23J 3/02 406/165 |
| 7,413,388 | B2 | * | 8/2008 | Krebs ................... B65G 53/08 406/60 |
| 7,841,808 | B2 | * | 11/2010 | Naunheimer .......... C10G 25/06 406/197 |
| 7,878,737 | B2 | * | 2/2011 | Naunheimer ............ B01J 8/125 406/123 |
| 7,972,103 | B2 | * | 7/2011 | Delves .................... G21F 9/304 414/137.5 |
| 8,075,227 | B2 | * | 12/2011 | Yuan ........................ B01J 8/003 422/291 |
| 8,252,117 | B2 | * | 8/2012 | Little .................... C23C 14/568 118/727 |
| 8,523,496 | B2 | * | 9/2013 | Bartek ................... B65G 53/66 406/60 |
| 8,596,931 | B2 | * | 12/2013 | Nagashima ............ B01J 20/267 406/197 |
| 8,727,671 | B2 | * | 5/2014 | Sundholm ............... B65F 5/005 406/198 |
| 8,905,681 | B2 | * | 12/2014 | Schneider .............. B65G 53/06 406/173 |
| 9,573,775 | B2 | * | 2/2017 | Shimono .................. F27D 3/16 |
| 9,617,088 | B2 | * | 4/2017 | Kraemer ............... B65G 53/06 |
| 10,138,077 | B2 | * | 11/2018 | Ellis ................... B65G 53/4691 |
| 10,189,054 | B2 | * | 1/2019 | Fuchigami ............. G01N 33/15 |
| 10,647,527 | B2 | * | 5/2020 | Stark ..................... B65G 53/10 |
| 10,815,078 | B2 | * | 10/2020 | Stark ..................... B65G 53/60 |
| 11,066,255 | B2 | * | 7/2021 | Kramer .................. B65G 53/40 |
| 11,320,204 | B2 | * | 5/2022 | Kusunose ............ F27D 3/0026 |
| 11,629,016 | B2 | * | 4/2023 | Benstead ........... B65G 53/4691 406/128 |
| 2011/0293380 | A1 | * | 12/2011 | Stuke ..................... B29B 7/603 406/122 |
| 2024/0071639 | A1 | * | 2/2024 | Tilton ....................... G21F 5/00 |

FOREIGN PATENT DOCUMENTS

| | | |
|---|---|---|
| CN | 206050977 U | 3/2017 |
| CN | 112224888 A | 1/2021 |
| CN | 112374166 A | 2/2021 |
| CN | 217296373 U | 8/2022 |
| DE | 3621149 A1 * | 6/1989 |
| EP | 0990606 A2 | 4/2000 |
| JP | S60-122629 A | 7/1985 |
| JP | H0899719 A | 4/1996 |
| JP | 7136375 B1 | 9/2022 |
| KR | 100923228 B1 | 10/2009 |
| KR | 102117640 B1 | 6/2020 |

* cited by examiner

SYSTEM FOR PNEUMATIC TRANSPORT OF PARTICLES OF A HAZARDOUS SUBSTANCE

TECHNICAL FIELD

The present disclosure relates to a system for pneumatic transport of particulate matter, particularly particles of a hazardous substance, more particularly radioactive particles.

BACKGROUND

Dilute phase pneumatic transport of particulate matter is well known in the art and can be used for conveying almost any particulate material. A conveying gas stream is accelerated to a velocity where the particulate material is picked up, entrained in the gas stream, and carried with the air stream to a desired collection point. Dilute phase pneumatic systems typically have a gas stream velocity of 4,000 to 6,000 ft/min. Up to 15 pounds of solid per pound of conveying gas may be transported by such a system.

Nuclear fuel particles that are too large, too small, or misshapen must be removed from the production process, transferred to a collection point, and batched for recovery processes. This operation is typically performed via hand-carried small containers and may be inefficient and labor-intensive. Hand carrying containers of nuclear fuel particles also increases the risk of radiation exposure to personnel handling such containers. An improved method of transporting nuclear fuel particles while minimizing radiation exposure of personnel would be desirable.

In view of the foregoing, it would be desirable to devise a safe system for pneumatic transport of nuclear fuel kernels and other hazardous particles.

SUMMARY

In light of the present need for improved methods of transporting hazardous substances, a brief summary of the disclosure is presented. Some simplifications and omissions may be made in the following summary, which is intended to highlight and introduce some aspects of the disclosed embodiments, but not to limit the scope of the invention. Detailed descriptions adequate to allow those of ordinary skill in the art to make and use the disclosed subject matter are provided.

Various embodiments disclosed herein relate to a system for pneumatically conveying hazardous particles, including a pneumatic conveyer for conveying the hazardous particles to an exit using a carrier gas; and at least one input mechanism for conveying the hazardous particles to the pneumatic conveyer. Each input mechanism includes a tubular chamber for receiving the hazardous particles; an input pipe extending from the tubular chamber for conveying the hazardous particles into the tubular chamber; and an output pipe extending from a bottom of the tubular chamber. A series of valves in the output pipe may include an upper valve movable between a closed position and an open position, a middle valve movable between a closed position and an open position, and a lower valve.

The upper valve and the middle valve, when in their respective closed positions, define a storage chamber for storing a portion of the hazardous particles. The upper valve in its open position allows the portion of the hazardous particles to enter the storage chamber, and the middle valve in its open position allows the portion of the hazardous particles in the storage chamber to flow to the lower valve. The lower valve is configured to convey the hazardous particles from the storage chamber to the pneumatic conveyer in a gradual fashion.

The system for pneumatically conveying hazardous particles may also include a means for optically monitoring a volume of the hazardous particles within the tubular chamber. The means for optically monitoring the volume of the hazardous particles may be a monitoring system configured to optically monitor a volume of the particles within the tubular chamber. In various embodiments, the input pipe extends laterally from the tubular chamber, and the monitoring system for optically monitoring the volume of the hazardous particles comprises a range-finding laser aimed longitudinally down the tubular chamber. In various embodiments, the monitoring system for optically monitoring the volume of the hazardous particles comprises a light source and an optical sensor, wherein the light source is aimed laterally across the tubular chamber toward the optical sensor. A safety enclosure may enclose the input pipe and at least an upper portion of the tubular chamber.

Various embodiments disclosed herein relate to a system for pneumatically conveying hazardous particles, including a pneumatic conveyer for conveying the hazardous particles to an exit using a carrier gas; and multiple input mechanisms for conveying the hazardous particles to the pneumatic conveyer. A first one of the multiple input mechanisms may convey the hazardous particles to a first point along a length of the pneumatic conveyer, and a second one of the multiple input mechanisms conveys the hazardous particles to a second point along the length of the pneumatic conveyer, where the first point and the second point along the length of the pneumatic conveyer are different.

Various embodiments disclosed herein relate to a system for pneumatically conveying hazardous particles, including a pneumatic conveyer for conveying the hazardous particles to an exit using a carrier gas; and at least three input mechanisms for conveying the hazardous particles to the pneumatic conveyer, where no two input mechanisms convey the hazardous particles to the same point along the length of the pneumatic conveyer.

Various embodiments disclosed herein relate to a system for pneumatically conveying hazardous particles, including a pneumatic conveyer for conveying the hazardous particles to an exit using a carrier gas; at least one input mechanism for conveying the hazardous particles to the pneumatic conveyer and an output mechanism for recovering the hazardous particles from the pneumatic conveyer. The output mechanism includes a receiving chamber for receiving the hazardous particles and the carrier gas from the pneumatic conveyer; an input pipe for conveying the hazardous particles from the pneumatic conveyer to the receiving chamber; and an output pipe extending from a bottom of the receiving chamber. A series of second valves in the output pipe extending from the receiving chamber includes a second upper valve movable between a closed position and an open position, a second middle valve movable between a closed position and an open position, and a second lower valve. The second upper valve and the second middle valve in their respective closed positions define a second storage chamber for storing the hazardous particles. The second upper valve in its open position allows the hazardous particles to enter the second storage chamber, and the second middle valve in its open position allows the hazardous particles in the second storage chamber to flow to the second lower valve. The second lower valve is configured to convey the hazardous particles from the storage chamber to a particle recovery hopper. A second safety enclosure may enclose the particle recovery hopper.

In various embodiments, the receiving chamber for receiving the hazardous particles from the pneumatic conveyer comprises a ventilation output for venting the carrier gas to a ventilation system. The ventilation output may include a filtration system for preventing the hazardous particles from entering the ventilation system.

In various embodiments, at least one of the lower valve in the input mechanism and the second lower valve in the output mechanism is a rotary airlock valve.

In various embodiments, at least one of the lower valve in the input mechanism and the second lower valve in the output mechanism may include a screw conveyer configured to transport the hazardous particles from an input end to an output end. For example, the lower valve in the input mechanism may include a screw conveyer configured to transport the hazardous particles from an input end connected with the middle valve to an output end connected with the pneumatic conveyer.

BRIEF DESCRIPTION OF THE DRAWINGS

In order to better understand various exemplary embodiments, reference is made to the accompanying drawings, wherein.

DETAILED DESCRIPTION

Figure 1:
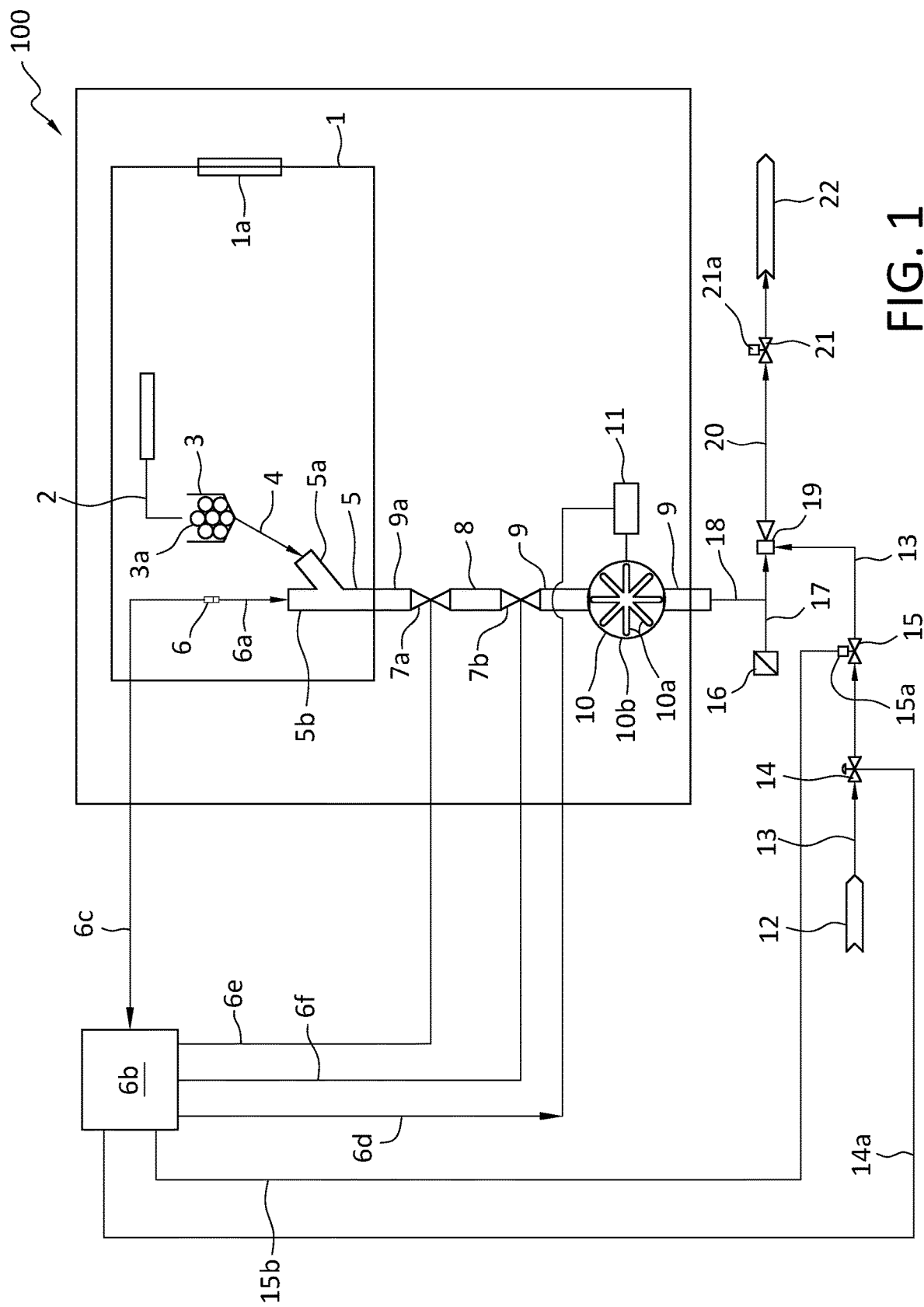
FIG. 1 illustrates a system for pneumatic transport of particles, including a first embodiment of a particle input fitting and a first embodiment of a system of valves for controlling particle transfer.

Referring now to the drawings, in which like numerals refer to like components or steps, there are disclosed broad aspects of various exemplary embodiments.

The present disclosure is directed to a pneumatic system for transporting scrap particles. Such particles may be designated as scrap particles for multiple reasons. The particles may be larger or smaller than a desired particle size or particle size range, rendering them unsuitable for their intended purpose. If the particles are coated, some particles may be designated as scrap because they are incompletely coated. Finally, some particles may be designated as scrap because they are misshapen or broken. For example, if spherical particles are desired, particles which are non-spherical may be designated as scrap. The scrap particles may have a mean particle size of 0.05 mm to 3 mm, 0.075 mm to 2 mm, 0.1 mm to 1.5 mm, 0.25 mm to 1 mm, or 0.35 mm to 0.6 mm.

The pneumatic system may be used for transporting various types of scrap particles. The particles may be ceramic particles, metallic particles, and organic or inorganic crystals or powders. The particles may be spherical or non-spherical particles. In various embodiments, the particles may be particles of hazardous materials. The particles may be poisonous, e.g., potassium cyanide, or carcinogenic, e.g., asbestos or polycyclic aromatic hydrocarbons. The particles may be radioactive materials, e.g., nuclear fuel kernels formed from uranium-, thorium-, or plutonium-based ceramic materials. In various embodiments, the particles may be nuclear fuel kernels containing radioactive ceramic cores, coated with at least one layer of pyrolytic carbon and/or a layer of a non-radioactive ceramic. The particles may be coated nuclear fuel kernels, which are designated as scrap because a carbon or ceramic coating is cracked, or incomplete, exposing the radioactive cores.

Referring to FIG. 1, the system 100 for pneumatically conveying hazardous particles includes a sealed chamber 1. The sealed chamber 1 may be a glovebox, where the contents of the glovebox are under ambient pressure, positive pressure, or negative pressure, relative to the outside atmosphere. The sealed chamber 1 has an access port 1a to allow scrap particles 3a, e.g., particles which are misshapen, too large, or too small, to enter the sealed chamber. The sealed chamber 1 may contain a tube or spout 2 which allows the scrap particles to enter a hopper 3. A tube 4 allows the scrap particles 3a to flow from hopper 3 to an entrance in an access pipe fitting, where the access pipe fitting may be a lateral wye fitting 5.

In the embodiment of FIG. 1, access pipe fitting 5 may be a lateral wye pipe fitting. The lateral wye fitting 5 includes a linear tube, and a tube 5a branching from the linear tube at an angle of 30° to 60, or about 45°, relative to the access of the linear tube. Particles 3a flow from hopper 3 through tube 4 into tube 5a, which serves as an input pipe, and collect in the linear tube of lateral wye fitting 5. The lateral wye fitting 5 may include a linear pipe with a 2" to 4" outer diameter (OD), with lateral branch 5a connecting to tube 4. Lateral branch 5a and tube 4 may have the same outer diameter or different diameters. If lateral branch 5a and tube 4 have different diameters, such as a 2" OD lateral branch 5a and a 4" OD tube 4. A reducer joint (not shown), which may be a concentric reducer joint or an eccentric reducer joint, may be used to connect them.

A port 5b is positioned at the upper end of the linear tube. A range-finding laser 6 sends a laser beam along the axis of the linear tube of the lateral wye pipe fitting, in the direction of arrow 6a. A valve 7a may be closed, causing particles 3a to collect in the linear tube of lateral wye fitting 5. The range-finding laser 6 aims a laser beam at the particles 3a collected in wye fitting 5. The laser beam reflects from particles 3a to a sensor on the range-finding laser 6, which sends a signal 6c to a processor 6b, where signal 6c indicates time required for detection of the reflected laser beam, i.e., the time difference between the time when the laser beam is emitted from range-finding laser 6 and the time when the sensor on laser 6 detects the reflected laser beam. Based on the time required to detect the reflected laser beam, the distance between laser 6 and particles 3a, and thus the height of the collected particles 3a in wye fitting 5, can be calculated by the processor 6b. Once the height of the collected particles is known, the processor can determine the volume occupied by the collected particles, based on the diameter of the linear tube of lateral wye fitting 5.

Once the volume of collected particles 3a in the lateral wye fitting 5 reaches a desired volume, a processor-controlled valve 7a is opened in response to a signal 6e from processor 6b, allowing at least a portion of the collected particles 3a in wye fitting 5 to pass through output pipe 9a and enter a tubular chamber 8. In various embodiments, input signal 6e is sent by the processor 6b after the processor 6b calculates that the volume of collected particles 3a in the lateral wye fitting 5 has reached the desired volume. The upper end of chamber 8 is defined by the valve 7a, while the lower end of chamber 8 is defined by a valve 7b. As particles 3a enter chamber 8, valve 7b is closed. Once the desired volume of particles 3a enters chamber 8, valve 7a is closed, scaling chamber 8. Valve 7b is then opened in response to a signal 6f from processor 6b, allowing the particles 3a in chamber 8 to flow through valve 7b through a tube or pipe 9 to a valve 10. Valve 10 is a rotary valve which is rotated by motor 11. As valve 10 rotates, it feeds particles 3a from an upper portion of tube 9 to a lower portion of tube 9 in a gradual fashion. The current disclosure defines "gradually feeding," or feeding "in a gradual fashion," as a feeding mechanism that receives falling particles at an entrance point, and feeds the particles to an exit point at a controlled rate.

The particles 3a fed by valve 10 to the lower portion of pipe 9 then flow through a pipe 18 to a pneumatic system containing a stream of flowing gas.

In various embodiments, valve 10 may be a rotary airlock valve. Rotary airlock valves 10 contain a housing 10b, and blades 10a rotating in the housing 10b. As blades 10a rotate, particles 3a fall from the upper portion of pipe 9 into spaces between two adjacent blades 10a. As valve 10 rotates at a controlled rate, a space between the adjacent blades 10a rotates into a position allowing particles 3a contained therein to flow downward into the lower portion of pipe 9. In rotary airlock valve 10, blades 10a contact housing 10b so as to form an airtight seal, preventing pressurized air from the pneumatic system from traveling upward through valve 10 while still moving particles 3a downward through valve 10.

Rotary airlock valve 10 may include 2 inch tri-clover entry and exit fittings, a maximum OD of four to 4.5 inches, and flexible blades 10 a made of neoprene or a similar flexible material. The rotary airlock valve 10 is controlled by a motor 11 which may rotate valve 10, or cease rotation of valve 10, based on an input signal 6d from processor 6b. In various embodiments, input signal 6d starting motor 11 is sent by the processor 6b after the processor 6b calculates that the volume of collected particles 3a in the lateral wye fitting 5 has reached the desired volume.

Again referring to FIG. 1, the pneumatic conveyer system includes a source of a conveying gas 12, which feeds the conveying gas air into pipe 13. The conveying gas may be compressed air, or a compressed inert gas. The compressed inert gas may be a noble gas, e.g., argon, nitrogen gas, helium, nitrogen, or carbon dioxide. Use of an inert gas as the carrier gas allows the system to be used for pyrophoric or volatile materials. The gas in pipe 13 is under elevated pressure.

The conveying gas flows through pipe 13 to a pressure reducing valve 14 and then through a valve 15. Valve 15 has a pressure sensor 15a designed to record the pressure of the air traveling through valve 15 and send a signal 15b reflecting the measured pressure to processor 6b. If the measured pressure is too high, processor 6b sends a signal 14a to pressure reducing valve 14, causing valve 14 to partially close, thereby reducing pressure at valve 15. If the measured pressure is too low, the signal 14a causes valve 14 to partially open, thereby increasing pressure at valve 15. The conveying gas then flows from valve 15 through pipe 13 to a venturi device 19, where the flowing gas enters pipe 20 leading to a conveyer distribution system 22. Venturi device 19 may be an eductor or an air-powered conveyor. Venturi device 19 generates suction, sucking conveying gas carrying particles 3a from pipe 18 through venturi device 19, and accelerates the gas stream carrying particles 3a into pipe 20.

As the conveying gas flows to the conveyer distribution system 22, it may flow through a valve 21 with a pressure sensor 21a, which may provide feedback regarding pressure to processor 6b, allowing processor 6b to further adjust pressure with pressure reducing valve 21. In various embodiments, valve 14 may be used to control the pressure of gas flowing from the source of conveying gas 12 to venturi device 19, while valve 21 may be used to control the pressure of gas flowing from venturi device 19 to the conveyer distribution system 22.

The venturi device 19 includes a Venturi tube with a reduced cross section, relative to pipe 13. The reduced cross-section due to the Venturi tube increases the velocity of the gas, as it flows from pipe 13 to pipe 20. This increased velocity in in venturi device 19 creates reduced pressure in flowing gas, relative to pipe 13. The reduced pressure in the venturi device 19 causes air from pipe 13 and air carrying particles in pipe 18 to be sucked into the venturi device 19. The air passing through venturi device 19 creates a high velocity gas stream in pipe 20. The particles 3a flow through pipe 18 to a pipe 17, and then to venturi device 19. Pipe 17 meets the pipe 13 carrying conveying gas at venturi device 19, allowing the gas flowing to venturi device 19 to pick up particles 3a and carry particles 3a through tube 20 to the conveyer distribution system 22. Pipe 17 may also have a vent with an inlet filter 16. The vent allows outside air, or gas from a secondary source, to be sucked through pipe 17 to venturi device 19, where this outside source of flowing gas assists in picking up particles 3a. The gas flowing through pipe 17 carries particles 3a through the venturi device 19, and then through pipe 20 to the pneumatic conveyer system 22. The inlet filter 16 prevents particles in the outside air or the secondary gas source from entering pipe 17, and then contaminating the particles 3a flowing to the conveyer distribution system 22.

As previously discussed, pipe 13 is at elevated pressure. Pipes 17, 18, and 20 are all at reduced pressure, relative to pipe 13. Pipes 17 and 18, before the venturi device 19, may be at slightly subatmospheric pressure. Pipe 20, after the venturi device 19, while at reduced pressure relative to pipe 13, may be at slightly greater pressure than pipes 17 and 18. In various embodiments, pipe 20 may be at slightly greater than atmospheric pressure.

Figure 1A:
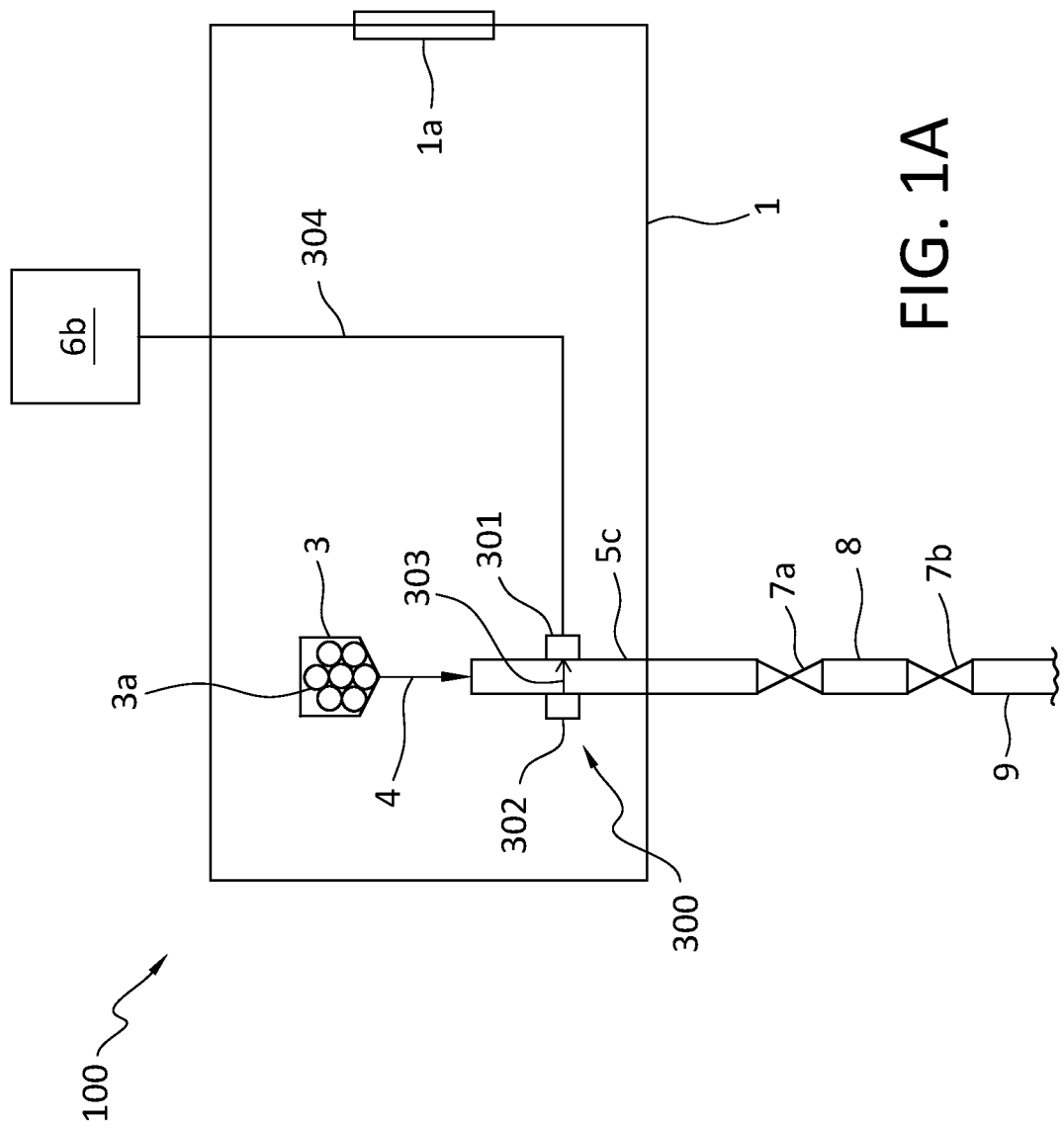
FIG. 1A illustrates a second embodiment of a particle input fitting for use in a system of FIG. 1.

Referring now to FIG. 1A, a variation of the system for pneumatically conveying hazardous particles is depicted, including the sealed chamber 1. The sealed chamber 1 has an access port 1a to allow scrap particles 3a to enter the sealed chamber 1. The sealed chamber 1 may contain a hopper 3 for receiving particles 3a. The scrap particles 3a may flow from hopper 3 through tube 4 to access pipe fitting 5c, where pipe fitting 5c is a linear pipe with a single port at its upper end. Particles 3a enter pipe fitting 5c through the port at its upper end. Valve 7a may be closed while particles 3a enter pipe fitting 5c, causing particles 3a to collect in pipe fitting 5c until the particles 3a reach a desired height in fitting 5c.

An optical sensor 300 is used to detect when particles 3a reach a desired height in fitting 5c. The optical sensor includes a light source 302, e.g., a light emitting diode or a laser, and a detector 301, e.g., a camera or a light sensor. Source 302 sends a light beam across the bore of pipe fitting 5c, in the direction of arrow 303, where the light beam is at a desired height. Particles 3a are allowed to collect in the pipe fitting 5c until the desired height is reached, at which point the light beam from source 302 is blocked. Once detector 301 no longer detects the beam from source 302, detector 302 sends a signal 304 to processor 6b. At this point, processor 6b sends a signal causing valve 7a to be opened, allowing the collected particles 3a in fitting 5c to enter pass through valve 7a and enter a tubular chamber 8, defined by valves 7a and 7b. After chamber 8 is full, valve 7a is closed. Valve 7b may then be opened, allowing particles 3a to flow through valve 7b into pipe 9, leading to a rotary airlock valve 10. The structure and function of the remaining elements of the system for pneumatically conveying hazardous particles, downstream of valve 7b, are substantially similar to those in the device as depicted in FIG. 1 and as described above.

Figure 1B:
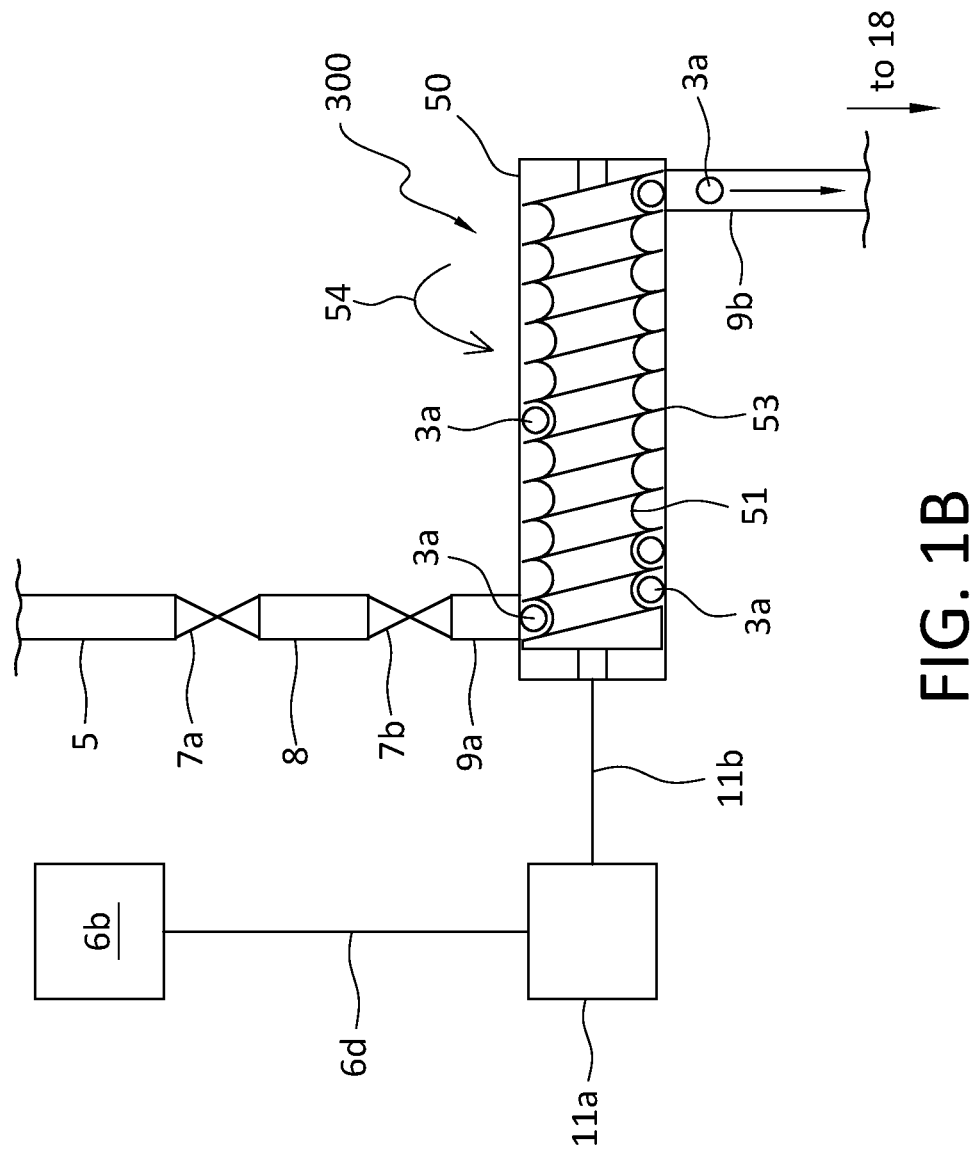
FIG. 1B illustrates a second embodiment of a system of valves for controlling particle transfer, for use in a system of FIG. 1.

FIG. 1B shows a second variation of the system for pneumatically conveying hazardous particles, where the system is substantially similar to the system of FIG. 1, except that the rotary airlock valve 10 has been replaced by a screw conveyer 300. As previously discussed, when the collected particles 3a in fitting 5 reach a desired volume, valve 7a is opened, allowing at least a portion of the collected particles 3a in fitting 5 to enter a tubular chamber 8 defined by valves 7a and 7b. As particles 3a enter chamber 8, valve 7b is closed. Once the desired volume of particles 3a enters chamber 8, valve 7a is closed, sealing chamber 8. Valve 7b is then opened, allowing the particles 3a in chamber 8 to fall through valve 7b through a tube or pipe 9a to a screw conveyer 300. Screw conveyer 300 includes a housing 50 and a screw shaft 51. Screw shaft 51 is rotated about its axis by a shaft 11b, which in turn is rotated at a controlled rate of speed by motor 11a. Motor 11a may begin rotation of screw shaft 51 upon receipt of a signal 6d from processor 6b, in substantially the same way that processor 6b initiates rotation of motor 11 in FIG. 1. Screw shaft 51 includes a helical thread 53, which in turn defines a space between adjacent turns of the thread which runs helically along the length of shaft 51. Pipe 9a leads to an interior of housing 50, allowing particles 3a to enter the space between the turns of thread 53. As shaft 51 rotates in the direction of arrow 54 at a controlled rate of speed, the thread 53 causes particles 3a to gradually move along the length of housing 50 until they reach pipe 9b. The particles 3a then exit the housing 50 of screw conveyer 300, and enter pipe 9b, leading to pipe 18 as described above with regards to FIG. 1. Pipe 18 leads to a pneumatic system containing pressurized air. The structure and function of the remaining elements of the system for pneumatically conveying hazardous particles, upstream of pipe 5 or downstream of pipe 18, are substantially similar to those in the device as depicted in FIG. 1 and as described above. Additionally, with regard to screw conveyer 300, at least a portion of thread 53 makes an airtight seal with the inner surface of housing 50, thereby preventing conveying gas from the pneumatic conveyer system from passing through screw conveyer 300.

Figure 2:
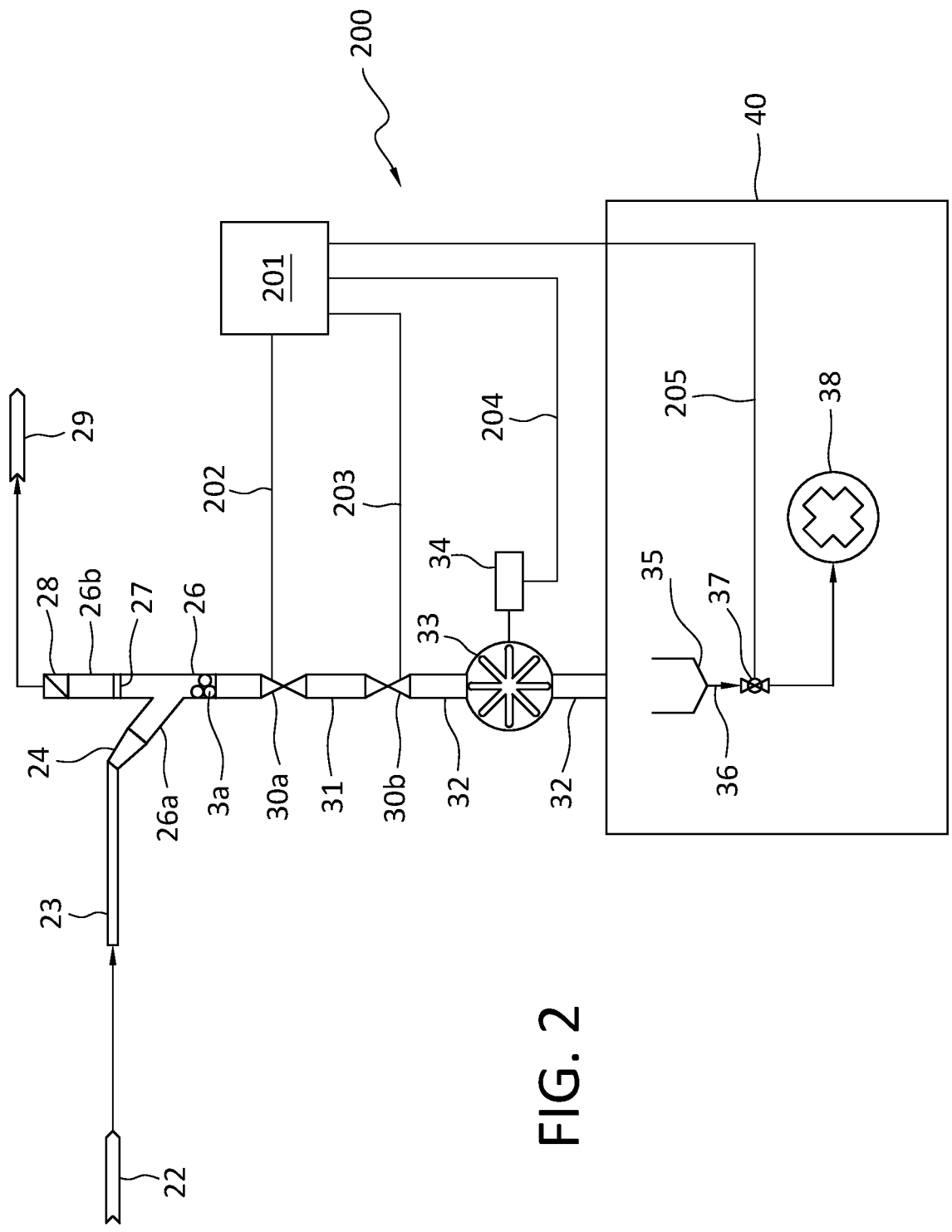
FIG. 2 illustrates a system for receiving pneumatically transported particles.

Referring to FIG. 2, the system 200 for receiving hazardous particles from a pneumatic conveyer is shown. Particles 3a from conveyer distribution system 22 are carried by flowing gas from the conveyer distribution system 22 into a pipe 23, which leads to an input pipe, which may be an input pipe 23 with a 2 inch diameter. Input pipe 23 may lead to a narrow end of a reducer fitting 24, e.g., a 4"×2" OD reducer 24, which connects to access pipe fitting 26. Access pipe fitting 26 may be a lateral wye pipe fitting. The lateral wye fitting 26 includes a linear tube, and a tube 26a branching from the linear tube at an angle of 30° to 60, or about 45°, relative to the access of the linear tube. A port 26b is positioned at the upper end of the linear tube. Port 26b allows air from the pneumatic conveyer system 22 to be ventilated to a main ventilation system 29. Before exiting port 26b and entering ventilation system 29, the air stream passes through a mesh filter 27 for removal of entrained macroscopic particles, e.g., particles 3a, and then through a high efficiency particulate air filter (HEPA filter) 28 for removal of smaller particles.

The bottom of wye fitting 26 connects to a valve 30a. As particles 3a are received from conveyer distribution system 22, valve 30a may be closed, causing particles 3a to collect in the linear tube of wye fitting 26. If desired, the system may determine when a desired height or volume of particles 3a within wye fitting 26 is achieved by using an optical sensor, substantially as shown in FIG. 1A.

Once a desired quantity of particles 3a collect in the wye fitting 26, valve 30a is opened, allowing at least a portion of the collected particles 3a in fitting 26 to enter a tubular chamber 31. The upper end of chamber 31 is defined by the valve 30a, while the lower end of chamber 8 is defined by a valve 30b. As particles 3a enter chamber 31, valve 30b is closed. Once the desired volume of particles 3a enters chamber 31, valve 30a is closed, sealing chamber 31. Valve 30b is then opened, allowing the particles 3a in chamber 31 to flow through valve 30b through a tube or pipe 32 to a valve 33. Valve 33 is an airtight valve, which may be a rotary airlock valve 33 which is rotated by motor 34. If desired, valve 33 may be a screw conveyer, substantially as shown in FIG. 1B. As valve 33 rotates, it gradually feeds particles 3a from an upper portion of tube 32 to a lower portion of tube 32. The particles 3a fed by valve 33 to the lower portion of pipe 32, then flow into a hopper 35 within a sealed chamber 40, e.g., a glovebox. Once a desired quantity of particles 3a collect within hopper 35, valve 37 is then opened, and particles 3a flow to a receptacle 38. Receptacle 38 may then be removed from sealed chamber 40, allowing disposal or recycling of scrap particles 3a.

Processor 201, which may be the same as, or different from, processor 6b in FIG. 1, may control operation of valves 30a, 30b, 33, and 37. Processor 201 may also control motor 34. When a desired height or volume of particles 3a within wye fitting 26 is achieved, signal 202 from processor 201 causes valve 30a to open. Subsequently, signal 202 may cause valve 30a to close, and signal 203 from processor 201 causes valve 30b to open. When signal 202 from processor 201 causes valve 30a to open, signal 204 from processor 201 causes motor 34 to begin rotation of rotary airlock valve 33. Once the hopper 35 is filled to a desired volume, signal 205 from processor 201 causes valve 37 to open, allowing particles 3a to flow to receptacle 38.

Figure 3:
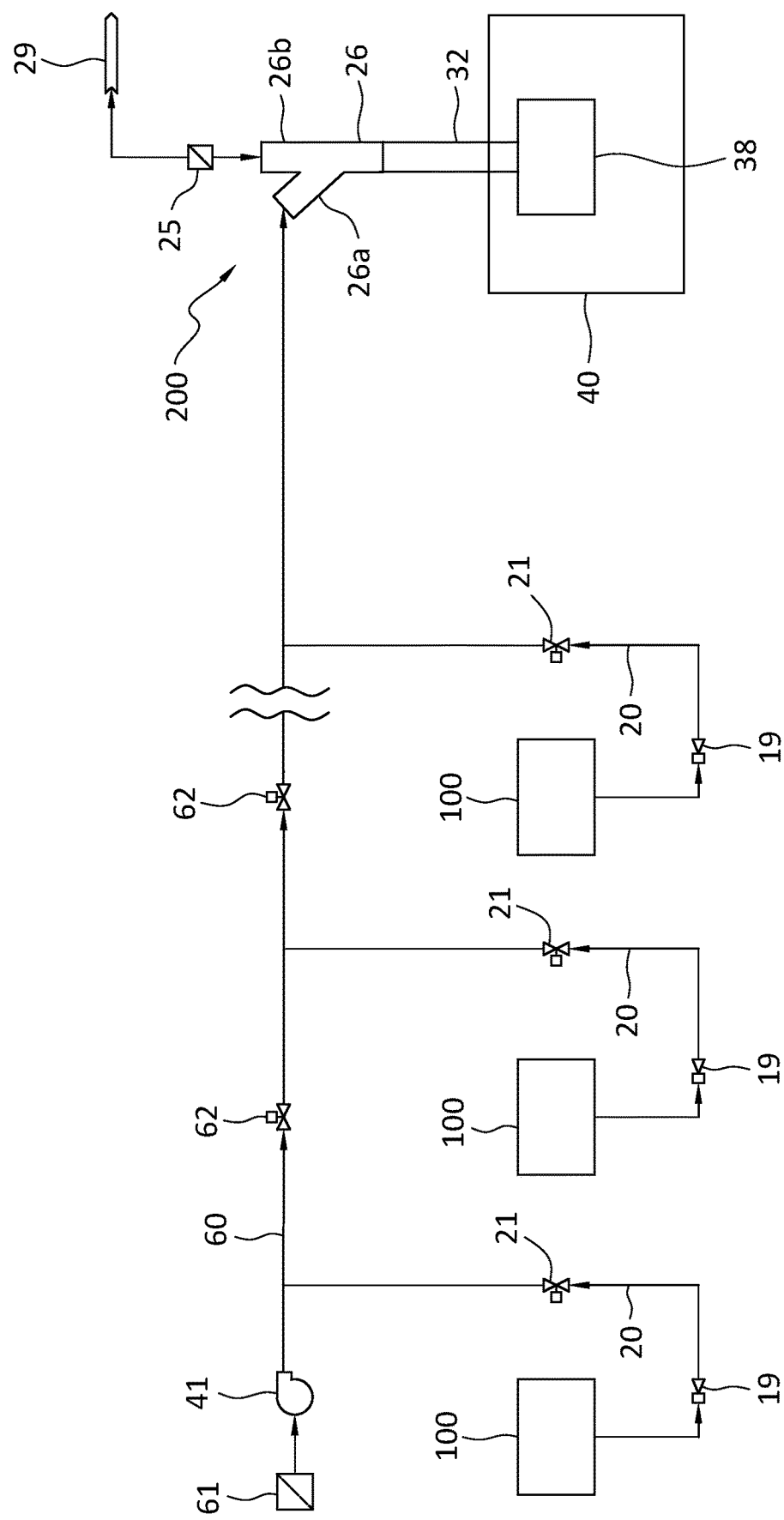
FIG. 3 shows a system for pneumatic transport of particles from multiple sources to a common particle recovery station.

FIG. 3 shows a system for delivering particles from multiple sorting stations to a common scrap particle recovery station. Each sorting station includes a system 100 as depicted in FIG. 1. In FIG. 3, there are multiple sorting stations, including a first sorting station with system $100_1$, a second sorting station with system $100_2$, and an $n^{th}$ third sorting station with system $100n$. As many sorting stations as desired may be included. There may be three sorting stations, with the third sorting station comprising system $100_n$. There may be n sorting stations, where n is a positive integer and there are n–3 sorting stations between system $100_2$ and system $100_n$. There may be two sorting stations, with the sorting station comprising system 100, being absent.

As discussed above with regard to FIG. 1, particles 3a from systems $100_1$, $100_2$, and $100_n$ are each fed to a separate venturi device 19 via a separate pipe 20. A stream of flowing gas, e.g., compressed air (not shown in FIG. 3), also flows to each venturi device 19. As the gas flows through the venturi devices, a stream of high velocity, low pressure, gas enters each pipe 20. A stream of gas is sucked through each venturi device 19 from a corresponding sorting station $100_1$, $100_2$, or $100_n$. This entrains the particles 3a from the corresponding system $100_1$, $100_2$, or $100_n$, carrying the particles 3a through a venturi device 19 into pipe 20. The flowing gas stream may flow through a valve 21 in each pipe 20, substantially as described in FIG. 1.

The particles 3a from each of systems $100_1$, $100_2$, and $100_n$ flow through a separate pipe 20 to a single pipe 60. Each pipe 20 may join the single pipe 60 at a separate point along the length of pipe 60, as shown in FIG. 3. Pipe 60 may be provided with a secondary source of pressurized gas. In some embodiments, the secondary source of pressurized gas may be a compressed air tank or a tank of an inert gas. Alternatively, an air pump 41 may receive air from a filtered air inlet 61, and blow air under pressure into pipe 60. Pressure in pipe 60 may be controlled by valves 62, where each valve 62 may be positioned between two junctions between pipe 60 and an incoming pipe 20.

The air stream in pipe 60 carries entrained particles to a common system 200 for receiving hazardous particles from a pneumatic conveyer, substantially as shown in FIG. 2. Particles 3*a* from pipe 60 are carried by pressurized gas into an access pipe fitting 26, e.g., a lateral wye pipe fitting. The lateral wye fitting 26 includes a tube 26*a* which receives particles 3*a* from pipe 60. A port 26*b* allows incoming air from pipe 60 to be ventilated to a main ventilation system 29 through a HEPA filter 28. Particles 3*a* collect in the wye fitting 26, and are allowed to flow through a tube or pipe 32 to a station for receiving scrap particles, e.g., a receptacle 38, in sealed chamber 40. Flow of particles from wye fitting 26 to receptacle 38 may be controlled using valves 30*a*. 30*b*, and 33 (not shown in FIG. 3), substantially as depicted in FIG. 2.

In various embodiments, the system as described in the present disclosure is used to safely transport hazardous particles. The hazardous particles may be nuclear fuel kernels. Where the hazardous particles are nuclear fuel kernels, each component of the system, including the wye fittings 5 and 26 of FIGS. 1 and 2, respectively, the various pipes for particles transport, and the various valves for controlling particle flow, including the rotary airlock valves 10 and 33 of FIGS. 1 and 2 and the screw conveyer 300 of FIG. 1B, should have a maximum outer diameter of four inches to prevent, or minimize the risk of, nuclear criticality accidents.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A system for pneumatically conveying particles, comprising:
- a pneumatic conveyer for conveying the particles to an exit using a carrier gas; and
- at least one input mechanism for conveying the particles to the pneumatic conveyer, each input mechanism comprising:
  - a tubular chamber for receiving the particles;
  - an input pipe extending from the tubular chamber for conveying the particles into the tubular chamber;
  - an output pipe extending from a bottom of the tubular chamber;
  - a series of valves in the output pipe, comprising:
    - an upper valve movable between a closed position and an open position,
    - a middle valve movable between a closed position and an open position, and
    - a lower valve; and
  - a monitoring system configured to optically monitor a volume of the particles within the tubular chamber;
- wherein:
  - the upper valve and the middle valve in their respective closed positions define a storage chamber;
  - the upper valve in its open position allows a portion of the particles to enter the storage chamber;
  - the middle valve in its open position allows the portion of the particles to flow to the lower valve; and
  - the lower valve is configured to convey the portion of the particles from the storage chamber to the pneumatic conveyer in a gradual fashion.

2. The system of claim 1, wherein the input pipe extends laterally from the tubular chamber, and the monitoring system comprises a range-finding laser aimed longitudinally down the tubular chamber.

3. The system of claim 1, wherein the monitoring system comprises a light source and an optical sensor, wherein the light source is aimed laterally across the tubular chamber toward the sensor.

4. The system of claim 1, further comprising a safety enclosure enclosing the input pipe and at least an upper portion of the tubular chamber.

5. The system of claim 1, comprising a plurality of input mechanisms for conveying the particles to the pneumatic conveyer.

6. The system of claim 5, wherein:
- a first one of the plurality of input mechanisms conveys the particles to a first point along a length of the pneumatic conveyer;
- a second one of the plurality of input mechanisms conveys the particles to a second point along the length of the pneumatic conveyer; and
- the first point and the second point along the length of the pneumatic conveyer are different.

7. The system of claim 6, wherein no two input mechanisms convey the particles to the same point along the length of the pneumatic conveyer.

8. The system of claim 1, further comprising an output mechanism for recovering the particles from the pneumatic conveyer, the output mechanism comprising:
- a receiving chamber for receiving the particles and the carrier gas from the pneumatic conveyer;
- an input pipe for conveying the particles from the pneumatic conveyer to the receiving chamber;
- an output pipe extending from a bottom of the receiving chamber; and
- a series of second valves in the output pipe extending from the receiving chamber, comprising:
  - a second upper valve movable between a closed position and an open position,
  - a second middle valve movable between a closed position and an open position, and
  - a second lower valve;
- wherein:
  - the second upper valve and the second middle valve in their respective closed positions define a second storage chamber for storing the particles;
  - the second upper valve in its open position allows the particles to enter the second storage chamber;

the second middle valve in its open position allows the particles in the second storage chamber to flow to the second lower valve; and the second lower valve is configured to convey the particles from the storage chamber to a particle recovery hopper.

9. The system of claim 8, wherein a second safety enclosure encloses the particle recovery hopper.

10. The system of claim 8, wherein the receiving chamber for receiving the particles from the pneumatic conveyer comprises a ventilation output for venting the carrier gas to a ventilation system.

11. The system of claim 10, wherein the ventilation output includes a filtration system for preventing the particles from entering the ventilation system.

12. The system of claim 1, wherein the lower valve is a rotary airlock valve.

13. The system of claim 1, wherein the lower valve comprises a screw conveyer configured to transport the particles from an input end connected with the middle valve to an output end connected with the pneumatic conveyer.

14. The system of claim 1, wherein the system is used for pneumatically conveying hazardous particles.

15. A system for pneumatically conveying particles, comprising:

a pneumatic conveyer for conveying the particles to an exit using a carrier gas; and at least one input mechanism for conveying the particles to the pneumatic conveyer, each input mechanism comprising:
   a tubular chamber for receiving the particles;
   an input pipe extending from the tubular chamber for conveying the particles into the tubular chamber;
   an output pipe extending from a bottom of the tubular chamber; and
   a series of valves in the output pipe, comprising:
      an upper valve movable between a closed position and an open position,
      a middle valve movable between a closed position and an open position, and
      a lower valve;

wherein:
   the upper valve and the middle valve in their respective closed positions define a storage chamber;
   the upper valve in its open position allows a portion of the particles to enter the storage chamber;
   the middle valve in its open position allows the portion of the particles to flow to the lower valve; and
the lower valve is configured to convey the portion of the particles from the storage chamber to the pneumatic conveyer in a gradual fashion, wherein:
the particles are nuclear fuel kernels; and
the tubular chamber, the input pipe, and the output pipe have a maximum diameter of four inches to minimize the risk of a nuclear criticality accident.

* * * * *